(12) United States Patent
Kwak

(10) Patent No.: US 9,401,123 B2
(45) Date of Patent: Jul. 26, 2016

(54) REQUEST SIGNAL OF AN IMAGE PROGRAM ACCORDING TO SPECIFIC INPUT SOURCES BASED ON THE RECEIVED LIST TO THE EXTERNAL DISPLAY DEVICES

(75) Inventor: Dong-Youp Kwak, Gumi (KR)

(73) Assignee: LG Electronics Inc., Seoul (KR)

( * ) Notice: Subject to any disclaimer, the term of this patent is extended or adjusted under 35 U.S.C. 154(b) by 992 days.

(21) Appl. No.: 13/139,832

(22) PCT Filed: Apr. 22, 2009

(86) PCT No.: PCT/KR2009/002106
§ 371 (c)(1),
(2), (4) Date: Jul. 11, 2011

(87) PCT Pub. No.: WO2010/071269
PCT Pub. Date: Jun. 24, 2010

(65) Prior Publication Data
US 2011/0265112 A1    Oct. 27, 2011

(30) Foreign Application Priority Data
Dec. 15, 2008 (KR) .................. 10-2008-0127050

(51) Int. Cl.
*G06F 3/00* (2006.01)
*G06F 13/00* (2006.01)
(Continued)

(52) U.S. Cl.
CPC ............ *G09G 5/006* (2013.01); *H04L 12/2812* (2013.01); *H04L 63/101* (2013.01); *H04N 21/4122* (2013.01); *H04N 21/43615* (2013.01); *H04N 21/44227* (2013.01); *H04N 21/4788* (2013.01); *H04N 21/485* (2013.01);
(Continued)

(58) Field of Classification Search
USPC .......................... 725/25, 48, 49, 79
See application file for complete search history.

(56) References Cited

U.S. PATENT DOCUMENTS 6,505,348 B1 * 1/2003 Knowles et al. ................ 725/49
2004/0073707 A1 * 4/2004 Dillon ............... H04L 29/12009
709/245
(Continued)

FOREIGN PATENT DOCUMENTS

EP     1 868 379 A2    12/2007
KR  10-2007-0035447     3/2007
(Continued)

OTHER PUBLICATIONS

European Search Report dated Aug. 17, 2012 issued in Application No. 09 83 3547.
(Continued)

*Primary Examiner* — Pankaj Kumar
*Assistant Examiner* — Charles N Hicks
(74) *Attorney, Agent, or Firm* — KED & Associates LLP

(57) ABSTRACT

A display device having a network function according to an exemplary embodiment is configured to include: a network interface unit that performs data communication with external displays through a network; and a controller that transmits access request signals to the external display devices through the network interface unit and receives a list of input sources information that access is permitted based on the access permission or not according to the access request, wherein the controller transmits a request signal of an image program according to specific input sources based on the received list to the external display devices.

26 Claims, 6 Drawing Sheets

(51) Int. Cl.
*H04N 5/445* (2011.01)
*G09G 5/00* (2006.01)
*H04N 21/4788* (2011.01)
*H04N 21/8545* (2011.01)
*H04L 12/28* (2006.01)
*H04L 29/06* (2006.01)
*H04N 21/41* (2011.01)
*H04N 21/436* (2011.01)
*H04N 21/442* (2011.01)
*H04N 21/485* (2011.01)
*G09G 5/12* (2006.01)

(52) U.S. Cl.
CPC ............. *H04N21/8545* (2013.01); *G09G 5/12* (2013.01); *G09G 2370/027* (2013.01); *G09G 2370/10* (2013.01); *H04L 65/4076* (2013.01); *H04L 65/4084* (2013.01); *H04L 2012/2849* (2013.01)

(56) References Cited

U.S. PATENT DOCUMENTS

| | | | |
|---|---|---|---|
| 2004/0194145 A1 | 9/2004 | Douillet et al. | 725/110 |
| 2005/0102698 A1 | 5/2005 | Bumgardner et al. | 725/80 |
| 2007/0157266 A1 | 7/2007 | Ellis et al. | 725/89 |
| 2007/0237077 A1* | 10/2007 | Patwardhan | H04L 47/10 370/230 |
| 2007/0280293 A1* | 12/2007 | Rajakarunanayake | 370/474 |
| 2008/0104201 A1 | 5/2008 | Moon et al. | |
| 2009/0125955 A1* | 5/2009 | DeLorme | 725/110 |
| 2009/0248794 A1* | 10/2009 | Helms | H04L 12/2861 709/203 |
| 2009/0328117 A1* | 12/2009 | Morris et al. | 725/105 |

FOREIGN PATENT DOCUMENTS

| | | |
|---|---|---|
| KR | 10-2008-0020805 | 3/2008 |
| KR | 10-2008-0095237 A | 10/2008 |
| WO | WO 00/04707 A1 | 1/2000 |
| WO | WO 03/026187 A2 | 3/2003 |

OTHER PUBLICATIONS

International Search Report issued in PCT Application No. PCT/KR2009/002106 dated Dec. 23, 2009.

* cited by examiner

REQUEST SIGNAL OF AN IMAGE PROGRAM ACCORDING TO SPECIFIC INPUT SOURCES BASED ON THE RECEIVED LIST TO THE EXTERNAL DISPLAY DEVICES

TECHNICAL FIELD

The embodiment relates to a display device, and in particular, to a display device having a network function and a method of controlling the same.

BACKGROUND ART

People can watch broadcasting contents and can be provided with various contents, such as contents on demand (COD), games, news, etc., in real time through Internet networks, which are connected to each home, in addition to existing broadcast media with the help of the development and commercialization of a digital-based digital television broadcasting technology.

Further, an internet protocol television (IPTV) is recently getting more and more attention. The IPTV means a service that provides information services, moving picture contents, and broadcasting contents to a television receiver using a high-speed Internet network.

The IPTV may be said to be one type of digital convergence from the viewpoint of a convergence of Internet and television. Also, a difference between the IPTV and the existing Internet TV is that a television receiver is used instead of a computer monitor and a remote controller is used instead of a mouse.

Only if a television receiver and a set-top box are connected to an Internet line, the IPTV can be used. Therefore, a user, which is not familiar with a computer, can simply perform Internet search as well as can be provided with additional services and various contents, such as movie watching, home shopping, home banking, on-line game, MP3, etc., which are provided by Internet, by using a remote controller.

However, the above-mentioned IPTV can use only broadcasting contents (limited number of channels) that are provided through broadcasting media, such as broadcasting network, by contents providers or service providers. As a result, a need exists for a display device capable of providing more various contents to a user and a method of controlling the same.

DISCLOSURE OF INVENTION

Technical Problem

In an exemplary embodiment, authentication for access permission between display devices is performed using a network function, such that the display devices can share input sources provided from each display device.

Further, in an exemplary embodiment, input sources from external display devices on which authentication for access permission is performed remotely can be watched by controlling them like their input sources.

Moreover, in an exemplary embodiment, hardware resources in an idle state between display devices connected through the network can be shared.

Also, in an exemplary embodiment, when display devices are overloaded, the works to be processed in the overloaded specific display devices can be distributively processed in display devices in an idle state Technical problems to be achieved by the exemplary embodiments are not limited to the above technical problems, but other technical problems can be understood by a person with ordinary skill in the art to which the present invention belongs from the following description.

Technical Solution

A display device having a network function according to the above exemplary embodiments includes: a network interface unit that performs data communication with external displays through a network; and a controller that transmits access request signals to the external display devices through the network interface unit and receives a list of input source information A display device having a network function according to an exemplary embodiment is configured to include: a network interface unit that performs data communication with external displays through a network; and a controller that transmits access request signals to the external display devices through the network interface unit and receives a list of input sources information that access is permitted based on the access permission or not according to the access request, wherein the controller transmits request signals of image programs according to specific input sources based on the received list to the external display devices.

Further, a display device having a network function according to an exemplary embodiment is configured to include: a network interface unit that performs data communication with external display devices through a network; a packetization unit that performs data packetization so that at least one image program can be transmitted to the external display devices through the network interface unit; and a controller that determines access permission or not of the external display devices according to access request signals transmitted from the external display devices and determines input sources to be shared with the external display devices according to the determined access permission or not, wherein the network interface unit transmits the input source information determined by the controller to the external display devices transmitting the access request signals.

Also, a method of controlling a display device having a network function according to an exemplary embodiment includes: transmitting access request signals to external display devices existing on a network; receiving a list of input source information that access is permitted from the external display devices; selecting any one specific input source on the list of input source information that access is permitted and transmitting request signals of image programs for the selected input source to the external display devices.

Moreover, a method of controlling a display device having a network function according to an exemplary embodiment includes: receiving access request signals transmitted from the specific external display devices through a network; determining access permission or not of the external display devices transmitting the access request signals; listing input source information to be shared with the external display devices based on the determined access permission or not; and transmitting the listed input source information to the external display devices.

Advantageous Effects

With the exemplary embodiments, the display devices connected through the network can share the input sources therebetween, thereby making it possible to secure unlimited input sources as well as provide more various contents to the user.

Further, with the exemplary embodiments, the workload of the specific display devices that are overloaded is distributively processed by sharing the hardware resources in the idle state, thereby making it possible to secure the fault-tolerance of the display device that is performing excessive works.

BEST MODE FOR CARRYING OUT THE INVENTION

Exemplary embodiments will be described.

In the following description, a term, "comprising does not exclude the presence of components or steps other than ones described.

Figure 1:
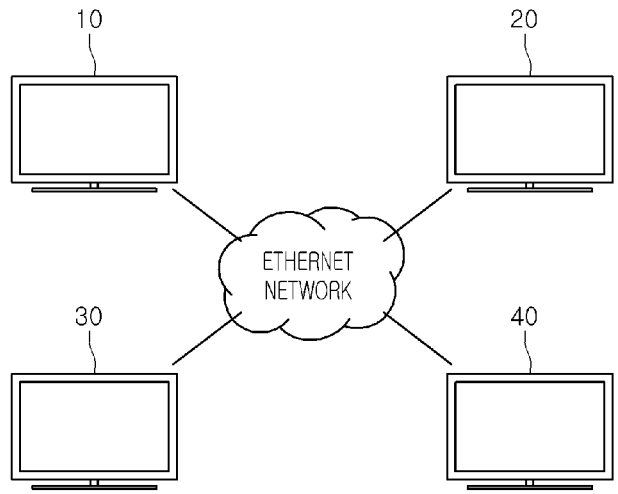
FIG. 1 is a diagram for explaining a concept of a display device having a network function according to an exemplary embodiment.

FIG. 1 is a conceptual diagram according to an exemplary embodiment.

Referring to FIG. 1, display devices 10, 20, 30, and 40 are connected through a network, thereby performing data communication therebetween.

Herein, the display device, which is an image device that can output image programs may include all devices that can receive and output the image programs provided from the outside or output pre-stored image programs. As one example, the display device may be a television, a monitor, etc., wherein the television or the monitor ma be wirelessly connected through the network.

Further, the network is preferably Ethernet. The Ethernet was developed in common in Xerox Corporation, Digital Equipment that is a corporation of manufacturing Mini Computer, and Intel Corporation that is a corporation of manufacturing semiconductor in the U.S. and is commercialized in 1980. LAN has been adopted as one standard scheme of American Institute of Electrical Engineers (IEEE) that is promoting international standardization.

Ethernet uses a carrier sense multiple access with collision detection (CSMA/CD) scheme for data transmission, as will be described below. In other words, a computer to transmit data checks whether a communication network is used or not and then can transmit data only after the communication network is not used.

Further, when the communication network is used, the computer waits for a predetermined time and then checks again whether the communication network is used or not to determine the transmission or not of data. Herein, whether the communication network is used or not is acknowledged based on an electrical signal.

Moreover, when two computers simultaneously checks whether the communication network is used or not and thus, acknowledge that the communication network is not used, if they simultaneously transmit data, data collision occurs. In order to provide against this situation, the computer transmitting data acknowledges whether the transmitted data is damaged or not. If the data is damaged, the computer retransmits the data. At this time, if two computers retransmit data at the same time, data collision occurs again. As a result, the retransmission time should be changed by a defined method.

In addition, a plurality of display devices are connected to each other based on an Ethernet network as described above, such that they request broadcasting data to each other or receive the requested data and output them.

Hereinafter, a display device according to exemplary embodiments of the invention will be described in detail with reference to the accompanying drawings.

Figure 2:
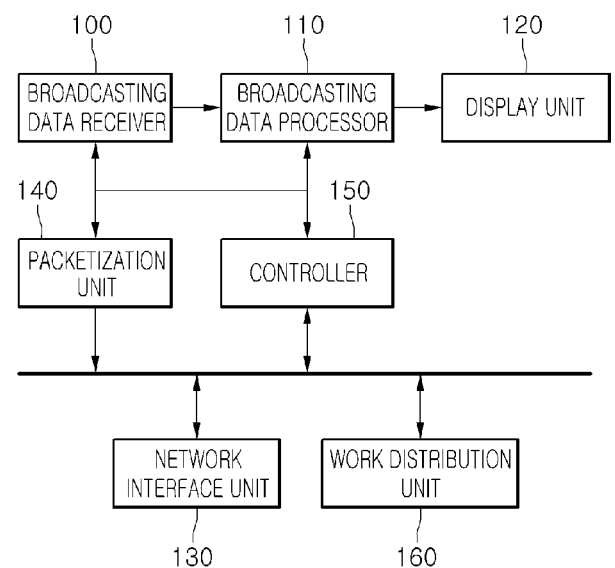
FIG. 2 is a diagram showing a configuration of a display device according to an exemplary embodiment.

FIG. 2 is a diagram showing a configuration of a display device having a network function according to an exemplary embodiment.

Herein, the display device access a specific external display device according to a request of a user, such that it may be a receiving device receiving an image program for a specific input source and a transmitting device transmitting an image program for a specific input source requested from the specific external display device. Hereinafter, a case where the display device performs operations according to the receiving device and a case where the display device performs operations according to the transmitting device will be described in order.

Referring to FIG. 2, the display device according to the exemplary embodiment is configured to include a broadcasting data receiver 100, a broadcasting data processor 110, a display unit 120, a network interface unit 130, a packetization unit 140, a controller 150, a work distribution unit 160.

Figure 3:
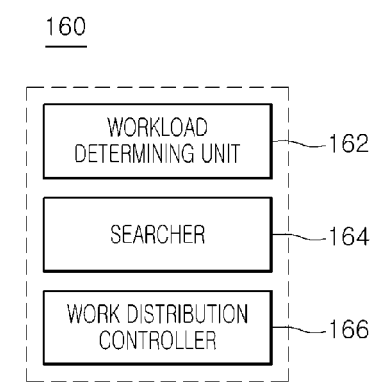
FIG. 3 is a diagram showing a detailed configuration of a work distribution unit according to an exemplary embodiment.

Further, as shown in FIG. 3, the work distribution unit 160 is configured to include a workload determining unit 162, a searcher 164, and a work distribution controller 166.

The broadcasting data receiver 100, which is a unit for receiving broadcasting data input from the outside, performs a function of receiving image programs through at least one unit.

In other words, the broadcasting data receiver 100 may be a digital tuner that receives digital broadcasting signals, an analog tuner that receives analog broadcasting signals, a digital external signal input terminal to which external devices are connected, and a digital recorder such as a personal video recorder (PVR) and a digital video recorder (DVR).

Herein, the digital external signal input terminal may be an input terminal for a digital cable broadcasting signal or a terminal to which a digital external player can be connected and the analog external signal input terminal may be a VCR signal input terminal or an input terminal for an analog cable broadcasting signal.

Moreover, the digital tuner tunes a transport stream of a desired channel among transport streams (TS), which are digital broadcasting signals input through an antenna for digital broadcasting, by a selection of a user. The analog tuner tunes an image program of a desired channel among image programs, which are analog broadcasting signals input through an antenna for analog broadcasting, by a selection of a user.

Therefore, the broadcasting data may include an analog broadcasting program that is being broadcasted in real time, a digital broadcasting program, a reproducing program input from an external player, a recording program, and a cable broadcasting program. Herein, when the broadcasting data are a digital signal, they include an image signal, a voice signal, and data and when the broadcasting data are an analog signal, they include an image signal and a voice signal.

The broadcasting data output through the broadcasting data receiver 100 are processed as a signal through the broadcasting data processor 110 and then are displayed through the display unit 120.

At this time, the broadcasting data processor 110 includes an MPEG-2 decoder and a scaler that converts the broadcasting data to meet vertical frequency, resolution, picture ratio, etc., corresponding to output standards of the display unit 120.

Herein, the display unit 120 can be applied to a various type of display modules such as a digital light processing (DLP), a liquid crystal display (LCD), a plasma display panel (PDP), a light emitting diode lamp (LED), an organic light emitting diodes (OLED), etc.

Further, the broadcasting data processor 110 may be further configured to include an OSD generating unit (not shown) that generates on screen display (OSD) data and transmitting them to the display unit 120. The OSD data may be a text message or a graphic message. When it is impossible to receive the image program requested from the user, the text message may be a notification message that notifies a user of it. Moreover, the OSD data may be a list of accessible input sources transmitted from the external display device. Therefore, a desired broadcasting station, a desired channel, a stored image program, and an image program reproduced by the external devices among broadcasting kinds received through the external display device can be selected by the list of accessible input sources. An OSD screen on which the OSD data is displayed will be described in detail below.

The network interface unit 130 serves as an interface in performing bidirectional data communication to transceiver data with the external display devices through the network.

At this time, the network interface unit 130 transmits/receives an access request signal to the specific external display device according to an operation instruction from the user or transmits/receives the image programs the specific input sources and the list of input sources transmitted from the specific external display.

The network interface unit 130 can be connected to the network through any one of wireless LAN (WLAN), wireless internet for mobile communication (EV-DO), and wireless broadband internet (WiBro). Meanwhile, the networks comprehensively means data communication networks that can provide internet access and is connected to each other by LAN, WAN, Intranet, and networks similar thereto, wherein the similar networks includes wired networks such as a dedicated network, a public switched telephone network (PSTN), etc., as well as a wireless network such as a mobile communication network, a satellite communication network, IMT-2000, etc.

The packetization unit 140 converts the image program according to the specific input source requested from the external display devices into an internet protocol (IP)-based packet signal and transmits it to the network interface unit 130. At this time, it is preferable that the packetization unit 140 is configured to be included in the network interface unit 130. Further, the conversion process is a process different from a format conversion process and is generally a process corresponding to a standard protocol.

The controller 150 controls the general operations of the display device.

In other words, in the operation of requesting the broadcasting data, the controller 150 receives the list of input source information that access is permitted among the input sources transmitted from at least one external display devices and requests the image program for any one of the input sources that access is permitted to the corresponding external display device according to the user's request.

In addition, in the operation of transmitting the broadcasting data, the controller 150 determines the access permission or not of the display device according to the access request signal transmitted from the external display device. And, if the access of the external display device is permitted, the input sources that can be transmitted to the display device that access is permitted or that the access of the display device will be permitted are determined. And, if the transmission request signal of the image program for any one of the determined input sources is received, the controller controls the image program for the corresponding input source to be transmitted to the corresponding external display device.

Hereinafter, in the operation (receiving device) of requesting the broadcasting data, the operation of the controller 150 will be described in more detail.

When the access instruction is input to the specific external display device among the external display devices connected to each other through the network, the controller 150 transmits the access request signal to the specific external display to which the access instruction is input.

Herein, as a method of selecting the external display device, there are a method of allowing a user to directly input information corresponding to the specific external display device and a method of selecting any one specific external display device among the external display devices having been accessed in the past.

Figures 4, 5, 6, 7:
FIG. 4 is a diagram showing one example of an external display device selecting screen according to an exemplary embodiment.
FIG. 5 is a diagram showing another example of an external display device selecting screen according to an exemplary embodiment.
FIG. 6 is a diagram showing one example of a display screen according to an exemplary embodiment.
FIG. 7 is a diagram showing a menu screen for determining access permission or not of an external display device according to an exemplary embodiment.

FIG. 4 is a diagram showing one example of an external display device selecting screen according to an exemplary embodiment.

Referring to FIG. 4, if the access instruction to the external display device is input from the user, an information inputting screen for inputting information corresponding to the external display device to be accessed is displayed.

Herein, the information corresponding to the external display device may include at least one of IP address information and MAC address information. The internet protocol (IP) address means an address of 32 bits provided as a concept meeting a physical network address in order to effectively perform a routing on Internet. If the IP address is used, a unique host on the network can be identified as well as the network having a host can be identified. The IP address is divided into classes and all the hosts shares the same prefix on one network.

Further, the MAC address (MACA, MCA address) means a physical address of Ethernet. In other words, among ones recorded in a read only memory (ROM) of an Ethernet card, there is an address of 48 bit-size, American Institute of Electrical Engineers (IEEE) assigns 24 bits of the first half to vendors and the vendors assign in detail 24 bits of the second half. A monitor initial screen for monitoring the communication network operating state displays names of each device by a MAC address (MACA) by previously assigning them to a network interface card (NIC). In addition, since it is difficult to discriminate the names of each device only by the above-mentioned manner, "search for all names is selected by a capture and MACM is converted into the device names. In general, it is 48-bit length and is used by being typically written in a personal computer (PC) or a ROM on a LAN node of a local area network (LAN) and designating a source and an address at a head (a head part) of a MAC layer data frame.

Therefore, the user inputs the IP address information or the MAC address information corresponding to the external display device to be accessed to the displayed information input screen, such that he/she can select the specific external display device to be accessed.

FIG. 5 is a diagram showing another example of an external display device selecting screen according to an exemplary embodiment;

As shown in FIG. 5, if the access instruction to the specific external display device is input from the user, the access history information on the external display device having been accessed in the past is displayed.

In other words, most users generally performs the access operation based on his/her preferred external display. Therefore, the access history of the external display device is recorded, such that the display device that the user wants to connect can be easily selected based on the access history.

The connection history screen is provided with the address information on the external display device having been accessed in the past, the display device information, and the final connection information.

The display device information means the name information on the corresponding display device. In other words, since it is difficult for the user to grasp the information on the corresponding external display device by using only the address information on the display device, the user information using the display device should be provided so that the user can easily select the desired display device. Also, the user can optionally input the specific information, such that the information on the display device can be set.

In addition, in addition to the above-mentioned method, the external display device to be accessed by the user can be selected by searching the external display devices accessible through the current network and providing the result information on the searched external display device to the user.

If the specific external display device to be accessed as above is selected, the controller 150 transmits the access request signal to the selected specific external display device through the network interface unit 130.

And, the controller 150 receives a response signal transmitted from the specific external display device according to the transmitted access request signal and controls the subsequent operations according to the received response signal.

In other words, the external display device receiving the access request signal determines the access permission or not of the display device transmitting the access request signal and transmits a response signal corresponding to the determined access permission or not to the display device.

In other words, when the external display device permits the access of the display transmitting the access request signal, it transmits the list of input source information to which the display device will be permitted to access among all the input sources to the display device. Further, to the contrary, when the external display device does not permit the access of the display device, it transmits a response signal corresponding to unable-to-permit access to the display device.

When the response signal corresponding to the unable-to permit access is transmitted from the external display device, the controller 150 displays a message "have restricted access to the corresponding external display device" Therefore, the user can recognize that he/she cannot access the selected specific external display device.

Also, when a response signal is transmitted according to the list of input source information that access is permitted from the external display device, the controller 150 displays the list of the transmitted input source.

Herein, the list of input sources may be information on a terrestrial digital broadcasting channel, a terrestrial analog broadcasting channel, a cable broadcasting channel, an external player (DVD), an internal digital recorder/player (PVR), etc.

And, when an item according to any one of the specific input sources is selected on the list of input sources to be displayed, sub-items of the corresponding items are displayed.

For example, when an item according to terrestrial digital broadcasting is selected on the list of input sources, channel information corresponding to the terrestrial digital broadcasting may be displayed as the sub-items of the terrestrial digital broadcasting. In other words, KBS, NBC, ABC, SBS, KNN, etc., which are channel information providing the terrestrial digital broadcasting, are displayed on the display screen.

In addition, when the items according to the internal digital storage device/player are on the list of input sources, the sub-items corresponding to the image programs stored in the internal digital storage device/player are displayed. In other words, when the internal player is selected, the previously stored recording list information, such as nine o'clock news, NBA basketball, movie (monster), drama (sisters), documentary (animal kingdom), etc., is displayed on the display screen.

When the image program according to the specific input source is selected on the list of input sources displayed as above from the user, the controller 150 transmits the request signal of the image program according to the selected specific input sources to the corresponding external display device.

And, the controller 150 receives the image program according to the specific input source transmitted from the external display device according to the transmitted image program request signal and displays the received image program.

FIG. 6 is a diagram showing one example of a display screen according to an exemplary embodiment.

Referring to FIG. 6, it can be confirmed that the image program according to a total of 9 input sources is displayed on the current display screen and the user watches the display screen divided into a total of 9 screens.

The image program according to the 9 input sources may also include the image program according to the specific input sources received in the corresponding display device and include the image program provided from the external display device of another user.

In other words, the user can request the image program to the external display device regardless of the number of image programs and select only any one of the requested image programs and watch it. Therefore, the user makes the input sources of the external display device having the network connection and access authorization as his or her input sources and can watch them.

Further, when the state changing request signal of the image program is received from the user during displaying the image program transmitted the external display device as above, the controller 150 transmits the control signal corresponding to the received state changing request signal to the specific external display device providing the image program.

The state changing signal may include any one of a channel number changing signal, a volume level changing signal, a playback state changing signal, and an input source kind changing signal.

In other words, if the channel number changing instruction is input from the user while the user watches the terrestrial image program transmitted from the display device of current user A, the controller 150 transmits the channel number changing signal of the terrestrial image program to the display device of user A. Therefore, the controller 150 controls the display of the corresponding image program according to whether the image program corresponding to the changed channel number is received or not.

Further, the requested control signal may include a source switching signal, an operation switching signal, a communication terminating signal, a volume controlling signal, a PVR playback, starting/terminating signal, an external player playback/terminating signal, etc.

Hereinafter, in the operation (transmitting device) of transmitting the broadcasting data, the operation of the controller 150 will be described in more detail.

When the access request signal is transmitted from the external display device, the controller 150 displays a menu screen for determining the access permission or not of the external display device receiving the access request signal.

FIG. 7 is a diagram showing a menu screen for determining access permission or not of a display device according to an exemplary embodiment;

As shown in FIG. 7, when the access request signal is transmitted from the external display device, the user information corresponding to the external display device transmitting the access request signal is displayed on the display screen, together with a message, "access request signal is transmitted from the display device as follows".

And, a message, "Do you permit access?" is displayed on one side of the display screen, such that the user determines the access permission or not of the external display device requesting the access based on the user information of the displayed external display device.

In other words, if item, "yes" is selected on the display screen from the user, the controller 150 permits the access of the external display device that requests access and if item, "no" is selected, it interrupts the access of the external display device that requests the access and transmits a response signal corresponding to the unable-to-permit access to the external display device transmitting the access request signal.

Also, when the access of the external display device is permitted, the controller 150 selects the input sources that access will be permitted among all the input sources, lists the selected input source information, and transmits it to the external display device.

Herein, as a method of selecting the input sources that access will be permitted, there are a passive selection method of selecting the input sources that access will be permitted according to a selecting signal of the user and an automatic selection method of selecting the input sources that access will be permitted based on unused input sources.

Figure 8:
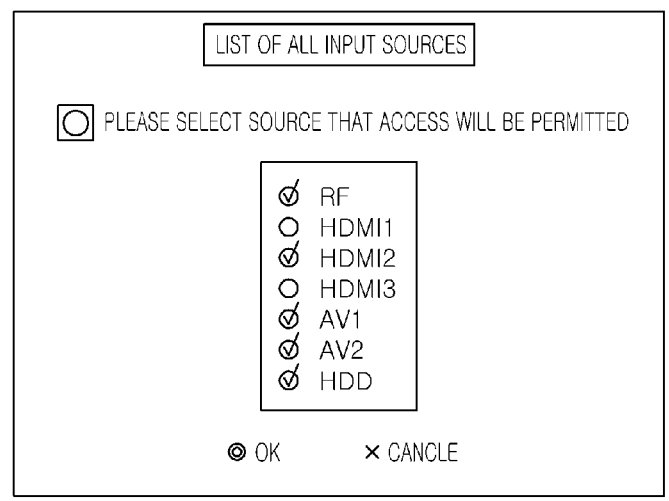
FIG. 8 is a diagram showing a screen for setting input sources that access will be permitted in an exemplary embodiment.

FIG. 8 is a diagram showing one example of a screen for selecting input sources that access will be permitted in an exemplary embodiment.

As shown in FIG. 8, a list according all the input sources is displayed on the display screen. And, when the selection signal according the specific input source on the list of all displayed input sources is input from the user, the input source selected from the user is determined as the input source that the access will be permitted.

Further, the determined input sources that access will be permitted are listed and the listed input sources are transmitted to the external display device.

For example, when RF, HDMI2, AV1, AV2, and HDD input sources are selected on the list of all input sources from the user, the controller 150 transmits the list of selected input sources to the corresponding external display device. Therefore, the external display device may use the RF, HDMI2, AV1, AV2, and HDD input sources provided from other display devices as its own input sources.

And, when the request signal of the image program according to the specific input source is transmitted from the external display device that access will be permitted, the controller 150 grasps the transmission possible state of the specific input source to which the request signal is transmitted.

In other words, the controller 150 determines whether the specific input source to which the request signal is transmitted is currently being used or not. In other words, the controller 150 may transmit the image program according to the specific input source to other external display device by the previous request of the external display device.

And, when the input source state is being used in other external display devices, the controller 150 transmits the transmission impossible signal of the corresponding input source to the external display device transmitting the request signal of the corresponding input source. Also, when the input source state is an unused state, the controller 150 transmits the image program according to the input source to the external display device.

Figure 9:
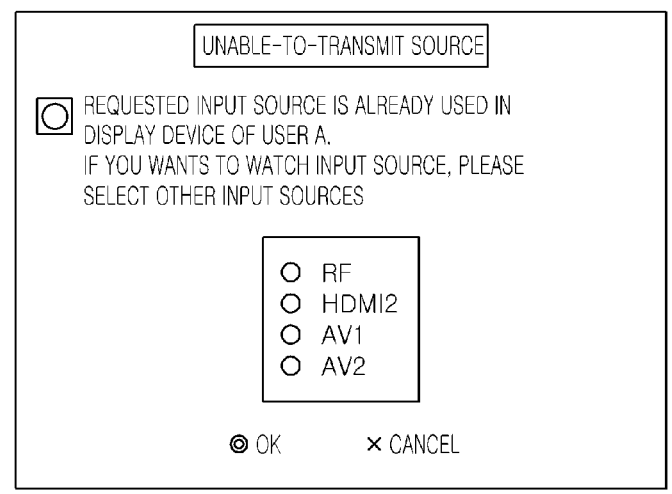
FIG. 9 is a diagram showing one example of an unable-to-transmit signal of a source according to an exemplary embodiment.

FIG. 9 is a diagram showing one example of an unable-to-transmit signal of a source according to an exemplary embodiment;

Referring to FIG. 9, when the input sources receiving the request signal are already used in other external display devices, the controller 150 transmits the OSD data capable of selecting any one input source other than the input sources among the input sources that access is permitted, together with a message, "the requested input sources was already used in the display device of user A. If the user wants to watch the input sources, please select other input sources".

Therefore, the user of the external display device can easily grasp the state of the requested input sources, such that the user can easily select other input sources that he/she wants to watch The work distribution unit 160 monitors the current workload of the display device and distributes the transmission of the image program for the specific input source to other external display devices according to the monitored workload.

Herein, the work distribution unit 160 is configured to include a workload determining unit 162 that monitors the current workload of the display device to determine whether the current workload exceeds the predetermined workload threshold value, a searcher 164 that if the current workload exceeds the predetermined workload threshold value, searches the display device in an idle state, and a work distribution controller 166 that distributes its own predetermined work to the display device searched through the searcher 164.

Hereinafter, the operation of the work distribution unit 160 will be described in more detail.

The workload determining unit 162 checks the current workload of hardware resources and determines whether the checked current workload exceeds the predetermined workload threshold value.

Herein, the determination criteria the workload include the process performance of the controller 150, the size of the memory (not shown), and the work load amount of the controller 150.

And, when the current workload determined through the workload determining unit 162 is beyond the predetermined workload threshold value, the search operation of the external display device to be distributed is performed in order to distribute the image program transmission operations to the accessed external display device to other external display devices.

In other words, the searcher 164 searches at least one display device distributing the transmission works that are being performed. At this time, the searcher 164 searches at least one external display device that provides the same input sources as the input sources transmitted to the current external display devices.

For example, when first broadcasting data of current source A, second broadcasting data of source B, and third broadcasting data of source C are transmitted to the external display devices, the external display devices providing at least one of the first broadcasting data of source A, the second broadcasting data of source B, and the third broadcasting data of source C are searched.

At this time, when the searcher 164 searches the external display devices, it acknowledges the display device having the hardware resources in the idle state based on the workload of the searched external display devices.

Consequently, the searcher 164 searches at least one external display device that provides the same broadcasting data as the broadcasting data transmitted to the current external display device among the external display devices having the hardware resources in the idle state.

The work distribution unit 166 distributes the transmission work, which is being performed, to the searched external display device based on the search result of the searcher 164.

In other words, for example, when the first broadcasting data of source A is transmitted to the first display device and the second display device providing the first broadcasting data of source A is searched, the work distribution controller 166 hands over the transmission work for the first broadcasting data of source A to the second display device. Therefore, the second display device transmits the first broadcasting data of source A to the first display device.

Consequently, the work distribution controller 166 is controlled to transmit the first broadcasting data of source A provided from the second display device to the first display device.

Therefore, the processing speed can be improved without wasting the whole hardware resources by distributing the work of the display device performing the work to which overload is applied using the shared hardware resources in the idle state between the respective display devices As described above, the display device having the network function according to the exemplary embodiment additionally implements TV inputs between users, which perform Ethernet connection and each access permission authentication, without limitation, thereby making it possible to improve user satisfaction by providing more various contents to the user.

Further, the exemplary embodiments distributively processes the works of the display device performing the works to which overload is applied by using the shared hardware resources in the idle state between the respective display devices, thereby making it possible to secure the fault-tolerance of the display device that is performing excessive works.

Figure 10:
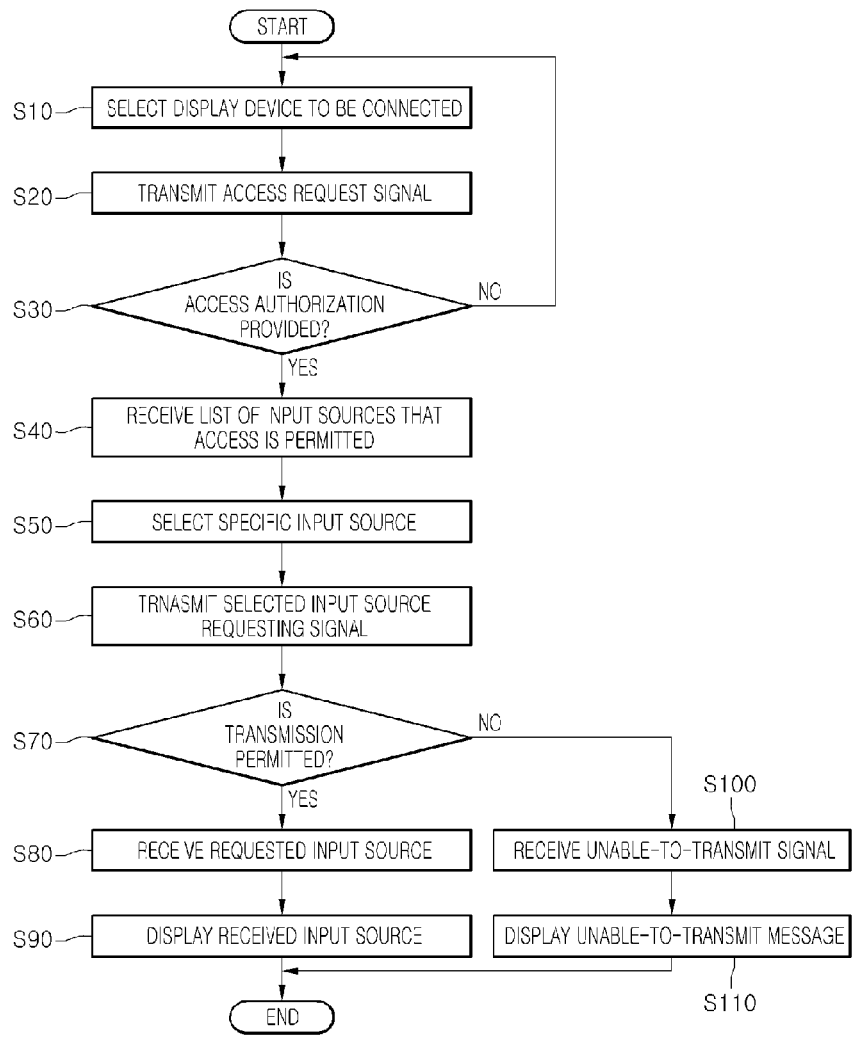
FIG. 10 is a flow chart for explaining an access request method step by step in a method of controlling a display device according to an exemplary embodiment.

FIG. 10 is a flow chart for explaining a method of controlling a display device having a network function step by step according to an exemplary embodiment.

Referring to FIG. 10, when an access instruction to the external display device from the user is first input, it selects the external display device to be accessed (S10). In other words, the user may directly input the address information on the external display devices to be accessed and select any one of the external display devices by displaying the history information having been accessed in the past.

Then, if the external display device to be accessed is selected, it transmits the access request signal to the selected external display device (s20).

And, it determines whether access authorization to the external display device is provided according to the transmission of the access request signal (s30). In other words, it determines whether the access to the external display device is permitted or not.

Then, as the determination result (s30), if the access authorization to the external display device is provided, it receives the list according to the input sources that access is permitted.

And, it receives the selection signal of the specific input source on the list of received input sources from the user (s50).

Thereafter, it transmits the request signal of the image program according to the selected input source to the external display device (s60).

And, it determines whether the image program according to the requested input source can be transmitted or not (s70).

Then, as the determination result (s70), if the requested input source can be transmitted, it receives the image program transmitted from the external display device (s80).

And, it displays the received image program (s90).

Then, as the determination result (s70), if the image program according to the requested input source cannot be transmitted, it receives the unable-to-transmit signal from the external display device (s100).

Then, the unable-to-receive message of the requested image program and the menu screen for selecting other input sources are displayed according to the received unable-to-transmit signal (s110).

Figure 11:
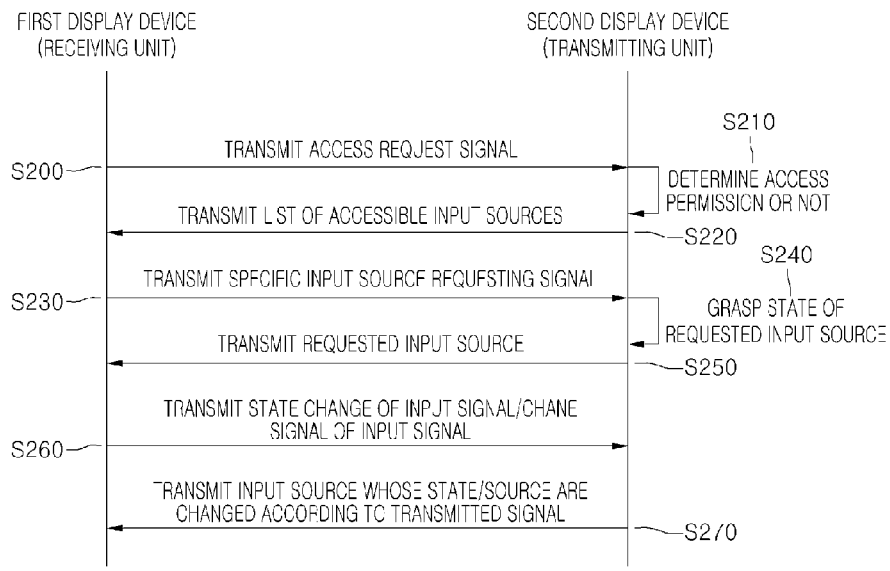
FIG. 11 is a diagram showing for explaining an operation flow between a display device of a receiving side and a display device of a transmission side in a method of controlling a display device according to an exemplary embodiment.

FIG. 11 is a diagram showing for explaining an operation flow between a display device of a receiving side and a display device of a transmission side in a method of controlling a display device according to an exemplary embodiment;

Referring to FIG. 11, when the specific external display device is first selected according the access from first display device (receiving side) to the external display device, the first display device transmits the access request signal to the selected second display device (s200).

The second display device receives the access request signal transmitted from the first display device. And, it acknowledges the information on the first display device receiving the access request signal to determine the access permission or not of the first display device (s210).

And, when the access of the first display device is permitted, the second display device determines the input sources that the access of the first display device will be permitted and transmits the list of determined input sources to the first display device (s220).

Then, the first display device receives the list of input sources that access will be permitted. And, when the specific input source is selected on the list of received input sources, it transmits the request signal of the image program according to the selected specific input source to the second display device (s230).

And, when the request signal of the image program according to the specific input source is transmitted from the first display device, the second display device grasps the transmittable state of the specific input source receiving the request signal (s240). In other words, it determines whether the requested input source is currently being used or not.

Then, if the current state of the specific input source is unused, the second display device packetizes the image program according to the corresponding input source in a wireless transmittable form and transmits it to the first display device (s250).

And, the first display device receives the image program transmitted from the second display device and displays it. Further, the first display device changes the state of the input source according to the user's request or transmits the control signal for changing the input source to the second display device (s260). Herein, the state changing signal of the input source includes the change increasing/decreasing signal, the volume increasing/decreasing signal, and the play/stop signal of the recording player and the external device and the input source changing signal is a signal for changing the currently received source to other sources.

Then, the second display device receives the state change signal of the input source or the input source changing signal transmitted from the first display device and thus, changes the currently transmitted input source state or input source kind and transmits it to the first display device (s270).

Figure 12:
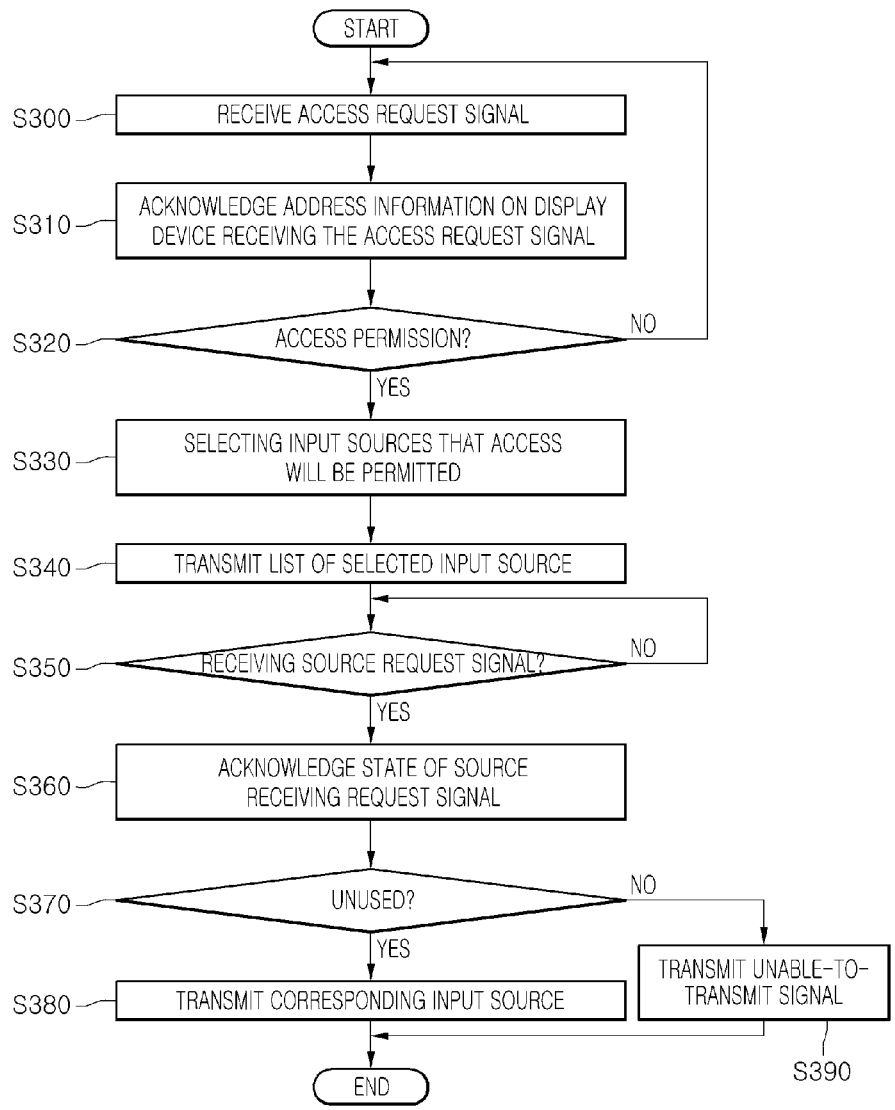
FIG. 12 is a flow chart for explaining a source transmission method step by step in a method of controlling a display device according to an exemplary embodiment.

FIG. 12 is a flow chart for explaining a method of transmitting an image program step by step in a method of controlling a display device according to an exemplary embodiment.

Referring to FIG. 12, it first receives the access request signal transmitted from the first display device (s300).

Then, it acknowledges the information on the external display device receiving the access request signal (s310).

And, it determines whether the access to the external display device receiving the access request signal is permitted or not (s320).

Then, as the determination result (s320), if the access of the external display device is permitted, it selects the input source that the access of the external display device will be permitted (s330). In other words, it selects the input source to be shared with the external display device.

And, it transmits the list of selected input source to the external display device (s340).

Thereafter, it determines whether the request signal of the image program according the specific input source is received from the external display device (s350).

And, as the determination result (s350), if the request signal of the image program according the specific input source is received from the external display device, it acknowledges the current state of the input source receiving the request signal (s360).

Then, it determines whether the state of the input source receiving the transmission request from the external display device is currently being used or not (s370).

And, as the determination result (s370), when the input source is not being used, it transmits the image program according to the input source to the external display device (s380).

Further, as the determination result (s370), when the input source is being used, it transmits the unable-to-transmit signal of the image program according to the external display device (s390).

Figure 13:
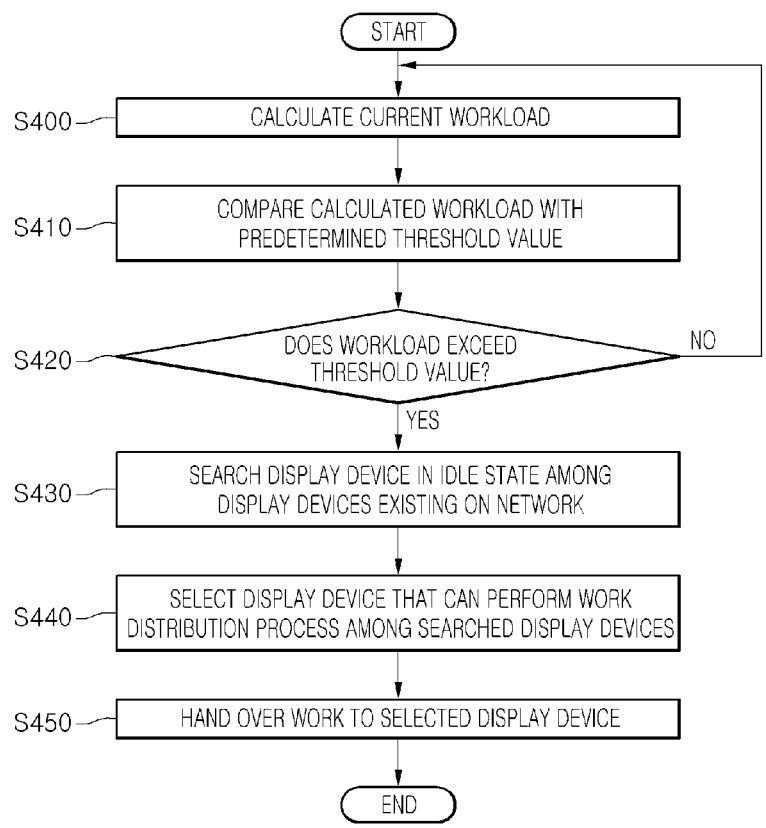
FIG. 13 is a flow chart for explaining a work distribution method step by step in a method of controlling a display device according to an exemplary embodiment.

FIG. 13 is a flow chart for explaining a work distribution method step by step in a method of controlling a display device according to an exemplary embodiment.

Referring to FIG. 13, the work distribution method of the display device according to the exemplary embodiment first calculates the workload processed according to the image program transmission to the external display device (s400).

Then, it compares the calculated current workload with the predetermined workload threshold value (s410).

And, it determines whether the calculated current workload exceeds the predetermined workload threshold value (s420).

Then, as the determination result (s420), if the calculated current workload exceeds the predetermined workload threshold value, it searches the external display device having the hardware resources in the idle state among the display devices existing on the network (s430). At this time, the searched external display device searches the external display device that provides the same image program as the image program transmitted to the current external display device.

Consequently, as the determination result (s420), if the calculated current workload exceeds the predetermined workload threshold value, it searches the same input source as the input source transmitted to the current external display device among the external display devices existing on the network (s430).

Then, it selects the external display device, which can perform the work distribution process, among the searched external display devices (s440).

And, it hands over the transmission work of the specific input source to the selected external display device (s450).

As described above, the method of controlling a display device having the network function according to the exemplary embodiment additionally implements TV inputs between users, which perform Ethernet connection and each access permission authentication, without limitation, thereby making it possible to improve user satisfaction by providing more various contents to the user.

Further, the exemplary embodiments distributively processes the works of the display device performing the works to which overload is applied by using the shared hardware resources in the idle state between the respective display devices, thereby making it possible to secure the fault-tolerance of the display device that is performing excessive works.

INDUSTRIAL APPLICABILITY

The present invention can be practiced in the display device providing the data broadcasting and thus, has industrial applicability.

The invention claimed is:

1. A display device having a network function, comprising:
a display unit;
a network interface unit that performs data communication with a plurality of external display devices through a network, the external display devices each including a plurality of input sources interfaces; and
a controller configured to:
  transmit access request signals to a specific external display device, from among the plurality of external display devices, through the network interface unit,
  receive a list of input source interfaces from the specific external display device in response to the access request signals, the list of input source interfaces including at least one input source interface that access is permissible among the plurality of input source interfaces, transmit request signals to the specific external display device, wherein the request signals represents transmission of image programs through a specific input source interface of the specific external display device, from among the plurality of input source interfaces, to the display device and the specific input source interface is one selected, by the display device, from the at least one access-permissible input source interface included in the received list of input source interfaces, receive, from the specific external display device, the image programs transmitted through the selected specific input source interface of the specific external display device when the selected specific input source interface of the specific external display device is currently not being used in other external display devices except for the specific external display device, and display, on the display unit, the image programs received through the selected specific input source interface of the specific external display device, wherein the input source interface is a physical terminal of the external display device for transmitting the image programs.

2. The display device having a network function according to claim 1, further comprising:
an image processor that processes a signal to be able to display the image programs received through the network interface unit.

3. The display device having a network function according to claim 1, wherein the display unit displays a plurality of image programs on a predetermined area of a display screen when the plurality of image programs are received from the specific external display device through the network interface unit, and the controller transmits request signals only for specific image programs selected from a user, from among the displayed image programs, to the specific external display device.

4. The display device having a network function according to claim 1, wherein the input source interface includes at least one of a tuner for digital broadcasting, a tuner for analog broadcasting, a cable broadcasting input terminal, an internal recording player, and an external player.

5. The display device having a network function according to claim 1, wherein the controller transmits a state changing signal for the provided image programs to the specific external display device according to a user's request.

6. The display device having a network function according to claim 5, wherein the state changing signal includes any one of a channel number changing signal, a volume level changing signal, a playback state changing signal, and an input source interface kind changing signal.

7. The display device having a network function according to claim 1, wherein the input source interface includes one of RF, HDMI, AV and HDD.

8. A display device having a network function and including a plurality of input source interfaces, comprising:
a network interface unit that performs data communication with a plurality of external display devices including a specific external display device through a network; and
a controller configured to:
receive access request signals from the specific external display device through the network interface unit,
determine access permission or not of the specific external display device in response to the access request signals,
generate a list of input source interfaces, the list of input source interfaces including at least one input source interface that access is permissible among the plurality of input source interfaces provided in the display device,
transmit the list of input source interfaces to the specific external display device,
receive request signals from the specific external display device, wherein the request signals represents transmission of image programs through a specific input source interface of the display device, from among the plurality of input source interfaces, to the specific external display device and the specific input source interface is one selected, by the specific external display device, from the at least one access-permissible input source interface included in the list of input source interfaces, and
transmit the image programs received through the selected specific input source interface to the specific external display device when the selected specific input source interface of the specific external display device is currently not being used in other external display devices except for the specific external display device,
wherein the input source interface is a physical terminal of the display device for transmitting image programs.

9. The display device having a network function according to claim 8, wherein the controller determines input source interfaces selected according to a user instruction or an input source interface, which are currently being unused, from the at least one access-permissible input source interface included in the list of input source interfaces.

10. The display device having a network function according to claim 8, wherein the controller grasps a transmittable state of image programs for the specific input source interface received through the specific input source interface and when the specific input source interfaces are currently an unable-to-transmit state, the controller transmits the unable-to-transmit signals of the input source interfaces to the specific external display device.

11. The display device having a network function according to claim 8, further comprising:
a work distribution unit that distributes a transmission work of the image programs according to the specific input source interface, which is currently being performed, to the specific external display device, the specific external display device having hardware resources in an idle state.

12. The display device having a network function according to claim 11, wherein the work distribution unit includes:
a workload determining unit that periodically monitors process workload to determine whether the process workload exceeds a predetermined threshold value;
a searcher that, when the process workload exceeds the predetermined threshold value, searches the external display devices in the idle state; and
a work distribution controller that distributes the transmission work of the image programs to the specific external display device in the idle state searched through the searcher.

13. The display device having a network function according to claim 12, wherein the searcher searches at least one external display device that provides the same input source interfaces as the input source interfaces transmitted to the specific external display device.

14. The display device having a network function according to claim 8, wherein the input source interface includes one of RF, HDMI, AV and HDD.

15. A method of controlling a display device having a network function, the method comprising:
   transmitting access request signals to a specific external display device from among a plurality of external display devices existing on a network, the external display devices each including a plurality of input source interfaces;
   receiving a list of input source interfaces from the specific external display device in response to the access request signals, the list of input source interfaces including at least one access-permissible input source interface that access is permissible among the plurality of input source interfaces;
   transmitting request signals to the specific external display device, wherein the request signals represents transmission of image programs through a specific input source interface of the specific external display device, from among the plurality of input source interfaces, to the display device and the specific input source interface is one selected, by the display device, from the at least one access-permissible input source interface included in the received list of input source interfaces,
   receiving, from the specific external display device, the image programs transmitted through the selected specific input source interface of the specific external display device when the selected specific input source interface of the specific external display device is currently not being used in other external display devices except for the specific external display device; and
   displaying, on a display unit, the image programs received through the selected input source interface of the specific external display device,
   wherein the input source interface is a physical terminal of the external display device for transmitting the image programs.

16. The method of controlling a display device having a network according to claim 15, further comprising:
   selecting the specific external display devices for transmitting the access request signals;
   the selection of the external display devices being formed by inputting IP address information or MAC address information on the external display devices to be accessed or selecting any one external display device of access history lists.

17. The method of controlling a display device having a network according to claim 15, further comprising:
   transmitting state changing signals of the image programs to the specific external display device.

18. The method of controlling a display device having a network according to claim 17, wherein the state changing signal includes at least any one of a channel number change, a volume level change, a playback state change, and an input source interface kind change.

19. The method of controlling a display device having a network function according to claim 15, wherein the input source interface includes one of RF, HDMI, AV and HDD.

20. A method of controlling a display device having a network function and including a plurality of input source interfaces, the method comprising:
   receiving access request signals transmitted from a specific external display device, from among a plurality of external display devices, through a network;
   determining access permission or not of the specific external display device in response to the access request signals;
   generating a list of input source interfaces, the list of input source interfaces including at least one input source interface that access is permissible among the plurality of input source interfaces provided in the display device;
   transmitting the list of input source interfaces to the specific external display device that transmitted the access request signals;
   receiving request signals from the specific external display device, wherein the request signals represents transmission of image programs through a specific input source interface of the display device, from among the plurality of input source interfaces, to the specific external display device and the specific input source interface being one selected, by the specific external display device, from the at least one access-permissible input source interface included in the list of input source interfaces; and
   transmitting the image programs received through the selected specific input source interface to the specific external display device when the selected specific input source interface of the specific external display device is currently not being used in other external display devices except for the specific external display device,
   wherein the input source interface is a terminal of the display device for transmitting image programs.

21. The method of controlling a display device having a network function according to claim 20, further comprising:
   when the transmittable state of the specific input source interface is an unable-to-transmit state, transmitting the unable-to-transmit signals of the specific input source to the specific external display device.

22. The method of controlling a display device having a network function according to claim 20, further comprising:
   changing the state of the image programs for the specific input source interface according to the state changing signal of the input source interface transmitted from the specific external display device,
   wherein the state changing signal of the specific input source interface includes at least any one of a channel number change, a volume level change, a playback state change, and an input source interface kind change.

23. The method of controlling a display device having a network function according to claim 20, further comprising periodically distributing some of works to be processed to the external display devices having hardware resources in an idle state based on the process workload according to the transmission of the image programs.

24. The method of controlling a display device having a network function according to claim 23, wherein the distribution of the works to the external display devices includes:
   monitoring current workload according the transmission of the input source interfaces;
   searching the external display devices having the hardware resources in the idle state when the current workload exceeds a predetermined threshold value; and
   requesting the transmission of the image programs for the specific input source interfaces to the searched external display devices.

25. The method of controlling a display device having a network function according to claim 24, wherein the searching of the external display devices having the hardware resources in the idle state includes searching other external display devices providing the same input source interfaces as the input source interfaces transmitted to the external display devices.

26. The method of controlling a display device having a network function according to claim 20, wherein the input source interface includes one of RF, HDMI, AV and HDD.

\* \* \* \* \*